United States Patent
Jones et al.

(10) Patent No.: US 7,634,446 B2
(45) Date of Patent: Dec. 15, 2009

(54) METHOD AND SYSTEM FOR PROVIDING PREPAID DATA SERVICE

(75) Inventors: Bryce A. Jones, Overland Park, KS (US); Von K. McConnell, Leawood, KS (US); Correy Trupp, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 2054 days.

(21) Appl. No.: 09/997,946

(22) Filed: Nov. 30, 2001

(65) Prior Publication Data

US 2007/0214083 A1    Sep. 13, 2007

Related U.S. Application Data

(63) Continuation-in-part of application No. 09/708,836, filed on Nov. 8, 2000, now Pat. No. 6,944,150.

(51) Int. Cl.
G06Q 40/00 (2006.01)
H04M 11/00 (2006.01)

(52) U.S. Cl. .............................. 705/41; 705/35; 705/39; 705/42; 455/406; 455/407

(58) Field of Classification Search .................. 705/41, 705/35, 39, 42; 455/406, 407
See application file for complete search history.

(56) References Cited

U.S. PATENT DOCUMENTS 5,991,748 A * 11/1999 Taskett ........................ 705/41

2002/0046255 A1 * 4/2002 Moore et al. ................. 709/218

FOREIGN PATENT DOCUMENTS

| EP | 1 065 828 A2 | | 3/2001 |
| WO | WO9821874 | * | 5/1998 |
| WO | WO9956254 | * | 11/1999 |
| WO | WO 00/69118 | | 11/2000 |

OTHER PUBLICATIONS

Sprint PCS- Services http://web.archive.org/web/20010417023351/e12.sprintpcs.com/services/net_shop.html.*
"SurePay™ Calling Card Services for PacketIN™ Solutions", Lucent Technologies Marketing Communications, Mar. 2000 (2 pages).

(Continued)

Primary Examiner—Kambiz Abdi
Assistant Examiner—Shahid R Merchant

(57) ABSTRACT

A method and system for providing prepaid data service. A subscriber terminal may establish a connection with a communications network. Based on a balance of a prepaid account, traffic from the subscriber terminal may be directed to a self-service portal. At the self-service portal, a user of the subscriber terminal may provide a credit card to add value to a prepaid account and to select a type of prepaid data service. The subscriber terminal may then be granted access to a data network. The balance of the prepaid account may be adjusted in accordance with the prepaid data service that is provided. When the balance of the prepaid account meets a threshold, the subscriber terminal's access to the data network may be redirected back again to the self-service portal.

19 Claims, 7 Drawing Sheets

OTHER PUBLICATIONS

"Turbocharging the Net Economy", Sun Presentation dated Jun. 30, 2000, www.sun.nl/evenementen/pdf/solect.pdf, last visited Nov. 30, 2001 (31 pages).

"Prepaid internet access", lists.q-linux.com/pipermail/plug/2000-November/001026.html, printed Nov. 29, 2001 (2 pages).

"Prepaid Internet Cards", www.ic2000.net/Internet_Services/INTERPASS/body_prepaid_internet_cards.html, printed Mar. 8, 2001 (2 pages).

"ISP Forum: Access, Infrastructure, Local Loop", www.isp-conferences.com/ispf2001/programme/day2.html, printed Nov. 29, 2001 (4 pages).

* cited by examiner

Welcome to XYZ's Self Service Portal

Click her to become a registered member

Register

Already Registered?

Log in:

Member Name: _____

Password: _____

Login

FIG. 3

XYZ's Login

How much time would you like to spend on the communications network?

- ◉ 10 minutes
- ○ 20 minutes
- ○ 30 minutes

Which of the following services would you prefer?

- ◉ 15 kbps
- ○ 50 kbps
- ○ 100 kbps
- ○ 200 kbps
- ○ 100 Mb/s
- ○ Service Package 1: HTTP: 150kbps, FTP: 100kbps, Video: 250 kbps
- ○ Service Package 2: HTTP: 75kbps, FTP: 50kbps, Video: 125 kbps Submit

FIG. 4

ALERT 5 minutes of pre-paid service remaining

FIG. 6

METHOD AND SYSTEM FOR PROVIDING PREPAID DATA SERVICE

RELATED APPLICATIONS

This application is a continuation-in-part of co-pending U.S. patent application Ser. No. 09/708,836, entitled "Method and System for Providing Services in Communications Network" filed on Nov. 8, 2000, now U.S. Pat. No. 6,944,150, issued Sep. 13, 2005. The entirety of this prior application is hereby incorporated by reference.

BACKGROUND

1. Field of the Invention

This invention relates to telecommunications services and, more particularly, to a method and system for providing prepaid data service. The technique described herein can extend to use in various types of communication sessions, whether circuit-switched or packet-switched, and whether a subscriber terminal is coupled wirelessly or by hardware (e.g., wire, fiber, etc.) to the communications network.

2. Description of Related Art

For many years, the telecommunications industry has recognized the need for restricting or otherwise managing use of communication services. Prepaid access enables the telecommunications industry to control usage of its communications network.

A subscriber may pay for a duration of communication services on the communications network by adding money into a prepaid account. A balance of the prepaid account typically represents a measure, i.e., dollar value, of communication services that a subscriber is authorized to use. The subscriber may present a credit card to a customer care agent to add money into the prepaid account. The subscriber may then be authorized to use the communication services on the communications network.

Communications services may be provided to the subscriber terminal while the balance of the prepaid account is above a threshold. As the subscriber uses the communications services, the service carrier may decrement the balance of the prepaid account. When the balance drops below the threshold (e.g., zero), the service carrier may refuse to provide additional services to the subscriber terminal.

Prepaid service is typically offered in a circuit-switched voice network. A subscriber type field of a subscriber record designates a prepaid subscriber. The subscriber record may indicate to a mobile switching center (MSC) that the subscriber has a prepaid subscription. The serving node may provide one or more partial call detail records (CDRs) during each call for the prepaid subscriber. The partial CDRs may indicate the duration of a call. The partial CDR may be output at periodic intervals during a call. The amount of time between the partial CDRs is configurable, for example, 5 minutes, 15 minutes, etc.

The partial CDRs may be sent to a metering system so that charging information can be calculated in near real time. The function of the metering system is to convert the call duration identified by the partial CDRs to a charge. The metering system also subtracts the charges from the account balance as the call progresses in order to determine the subscriber's account balance in near real time. If the balance is zero and the call is still ongoing, a home location registry (HLR) may remove the subscriber's subscription. The MSC may then disconnect the call.

The user of the subscriber terminal may then have to contact the customer care agent again. The customer care agent may allow the user add to the balance by making an additional prepayment, for example with a credit card. If the user adds to balance, the subscriber terminal may, again, be provided with prepaid access.

SUMMARY

The present invention stems from a realization that the services provided by communications networks are limited. Typical communications networks only provide prepaid voice services. Furthermore, the typical communications networks require intervention of a customer service agent to add money to the prepaid account. Communications networks, however, are rapidly supporting data services. Therefore, it would be advantageous to have a method and system for providing prepaid data service.

In accordance with a principle aspect of the present invention, a subscriber terminal, such as a computer or cellular telephone, may be granted access to a data network, such as the Internet, based on the balance of a prepaid account.

If the balance meets a threshold (e.g., balance is less than or equal to threshold), traffic from the subscriber terminal may be directed to a self-service portal. The self-service portal may allow the user to add value to the prepaid account without the intervention of a customer care agent. For example, the self-service portal may accept an account number, such as a credit card, debit card, or frequent flyer miles, to pay for prepaid service. The self-service portal may also allow the user to select a level of service. The services that the user may select may include a duration of access to the data network, access to the data network at a specific data rate, or a specific number of transactions such as stock quotes. The self-service portal may present various options for the user to select on a display screen of the subscriber terminal. Then, the subscriber terminal may be granted access to the data network.

If the balance does not meet a threshold (e.g., balance is greater than or equal to threshold), then the subscriber terminal may be granted access to the data network without directing the traffic to the self-service portal. The subscriber terminal may be able to send traffic to the data network.

The balance of the prepaid account may be adjusted as the prepaid data services are provided to the subscriber terminal. When the balance of the prepaid account meets a threshold, then the traffic from the subscriber terminal may be redirected to the self-service portal. The self-service portal may present the user with options to add value to the prepaid account and/or select another type of service. With the balance of the account being replenished, the subscriber terminal may be again granted access to the data network in accordance with the exemplary embodiment of the present invention.

Thus, in one respect, an exemplary embodiment of the present invention may take the form of a method and system for providing prepaid data service. A subscriber terminal may establish a communication session with an access gateway. A determination may be made whether a balance of the prepaid account meets a threshold. If the determination is made that the balance of the prepaid account does not meet the threshold, then a data gateway may pass traffic to a requested destination. As traffic passes, the data gateway may send alerts to the subscriber terminal. The alerts may provide a notification of prepaid data access available to the subscriber terminal. If the determination is made that the balance of the prepaid account meets the threshold, then the data gateway may redirect the traffic to a self-service portal. The self-service portal may reside on a web server. At the self-service portal, a subscriber may add value to the balance of the prepaid account and select a level of prepaid data access to a data network.

A billing server may keep track of the balance of the prepaid account. The data gateway may subscribe to the billing server to determine the balance of the prepaid account. The data gateway may then receive an indication of the balance of the prepaid account. Alternatively, the data gateway may receive an indication of the balance of the prepaid account as a result of polling. The indication may be whether the balance of the prepaid account meets a threshold.

In another respect, an exemplary embodiment of the present invention may involve making a first determination of whether a balance of a prepaid account does not meet a first threshold. If the first determination is that the balance of the prepaid account does not meet the first threshold, then a data gateway may pass traffic from a subscriber terminal to a requested destination. If the subscriber terminal is dropped from an access gateway and the subscriber terminal reestablishes a communication session with an access gateway, then a second determination is made whether the balance of a prepaid account meets a second threshold. If the second determination is that the balance of the prepaid account meets the second threshold, then the data gateway may redirect the traffic to a web server that runs a self-service portal. At the self-service portal, a subscriber may add value to the balance of the prepaid account.

This as well as other aspects and advantages of the present invention will become apparent to those of ordinary skill in the art by reading the following detailed description, with appropriate reference to the accompanying drawings.

BRIEF DESCRIPTION OF THE DRAWINGS

Exemplary embodiments of the present invention are described herein with reference to the drawings, in which:

FIG. 3 is an exemplary screen for logging into a self-service portal;

FIG. 4 is an exemplary screen for selecting a level of service at the self-service portal;

FIG. 6 is an exemplary screen of an alert; and

DETAILED DESCRIPTION OF EXEMPLARY EMBODIMENTS

A. Exemplary Network Architecture for Prepaid Data Service

Figure 1:
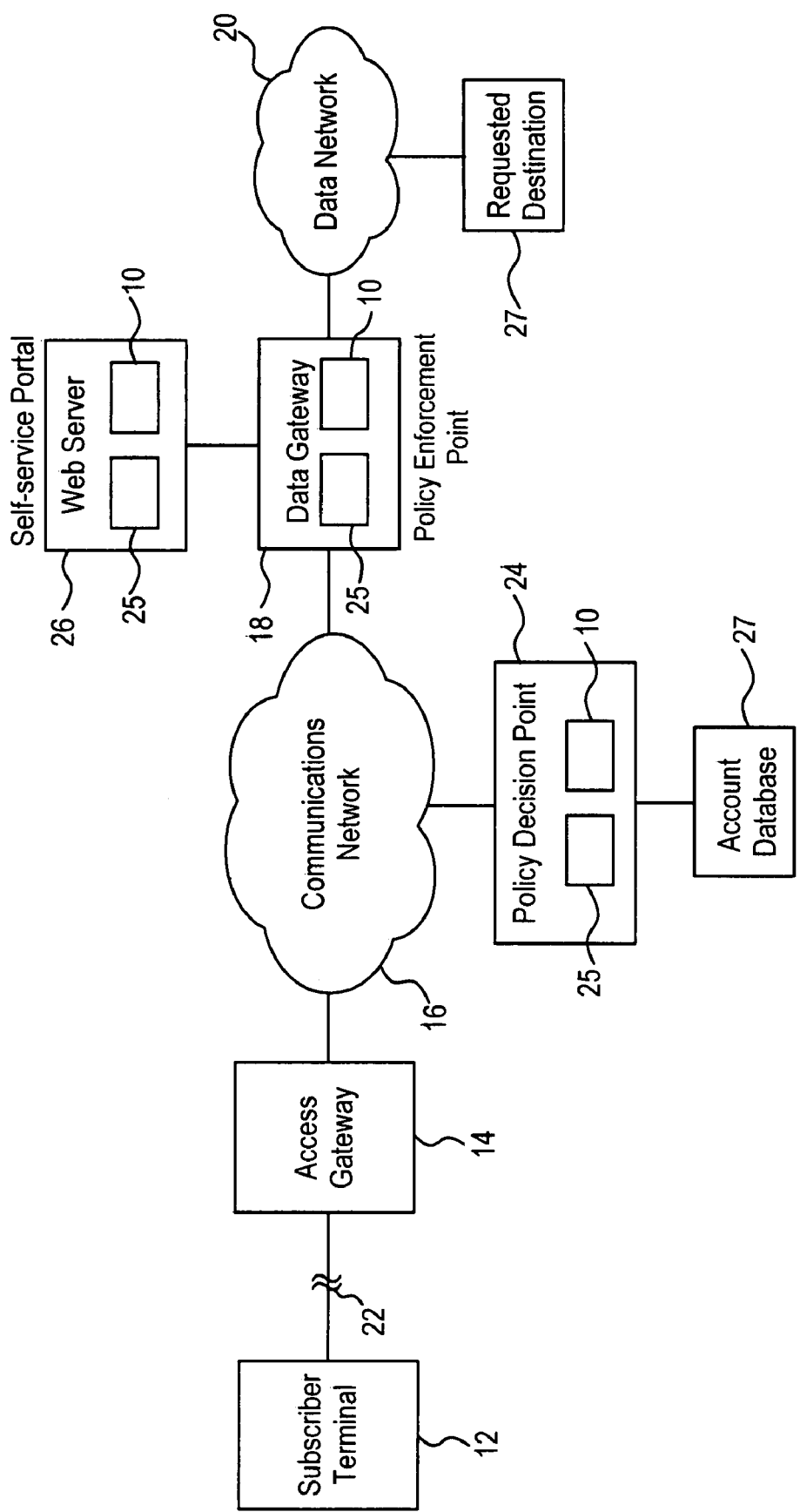
FIG. 1 is a block diagram of an exemplary network architecture configured to offer prepaid data service.

FIG. 1 is a block diagram of a network architecture in which exemplary embodiments of the present invention may be employed. The network architecture includes a communications network and a data network cooperatively configured to offer prepaid data service. The communications network and the data network may each consist of a landline network, a wireless network, and/or a combination of wireless network and landline network. Other arrangements are also possible.

Those skilled in the art will appreciate that many of the elements described in various embodiments of the present invention are functional entities that may be implemented as discrete components or in conjunction with other components, in any suitable combination or location. Still further, various functions described herein as being performed by one or more entities may be carried out by a processor programmed to execute an appropriate set of computer instructions stored in memory. Provided with the present disclosure, those skilled in the art can readily prepare the appropriate set of computer instructions to perform the various functions.

Referring again to FIG. 1, a subscriber terminal 12 may communicate with a communications network 16. The subscriber terminal 12 may be a wired device, such as a computer, or wireless device, such as a cellular telephone or a personal digital assistant (PDA). Depending on the type of subscriber terminal 12, the communications network 16 may be a wireless network, a landline network, or a combination of a wireless network and a landline network. Of course, other arrangements are also possible.

Traffic from a user, including data signals and control signals, may be exchanged between the subscriber terminal 12 and the communications network 16 via an interface 22 and an access gateway 14. The interface 22 may enable communications between the subscriber terminal 12 and the access gateway 14. The interface may be a physical connection such as a wire or fiber optic cable or wireless connection such as air. The type of interface 22 may depend on whether the subscriber terminal 12 is a wired or wireless device.

The access gateway 14 may enable the subscriber terminal 12 to communicate with the communications network 16 over the interface 22. If the interface 22 is a wire or fiber optic cable, the access gateway 14 may physically interface the subscriber terminal 12 with the communications network 16. If the interface 22 is air, the access gateway 14 may produce a radio frequency radiation pattern that permits the access gateway 14 to exchange traffic with the subscriber terminal 12 over the air interface 22.

The communications network 16 may operate as a circuit-switched network, a packet-based network, or a combination thereof. The communications network 16 may be connected to a data network 20 by a data gateway 18. The data network 20 may be a local area network, a wide area network, or the Internet. The data gateway 18 may connect the communications network 16 to the data network 20 so that traffic may be exchanged between the two networks.

A policy decision point 24, the data gateway 18, and a web server 26, each having a memory 25 and a processor 10, may cooperatively facilitate prepaid data service over the communications network 16. Prepaid data service is a service in which the subscriber terminal 12 may access the data network 18 based on a value stored in an account. The value may be in the form of a util such as cash, credit, or time. The value may take other variations as well.

Upon the subscriber terminal 12 establishing a communication session with the communications network 16, the policy decision point 24 may query a balance of a prepaid account. The balance may be, for example, stored in an account database 27 connected to the policy decision point 24. The policy decision point 24 may compare the balance to a threshold to determine if the balance is sufficient to allow the subscriber terminal to access the data network 20. The threshold may be a value (e.g., zero or a non-zero) that defines whether the subscriber terminal is allowed to access the data network 20.

If the balance does not meet a threshold (e.g., balance is greater than or equal to threshold), then the subscriber terminal 12 may be granted access to the data network 20. The subscriber terminal may send traffic to a requested destination 28.

If the balance of the prepaid account meets a threshold (e.g., balance is less than or equal to threshold) or, alternatively, if the subscriber terminal 12 does not have an account, the policy decision point 24 may instruct the data gateway 18 to pass data traffic from the subscriber terminal 12 to the web server 26. The web server 26 may send a screen (e.g., an HTTP web page or a WAP card), displayable on the subscriber terminal, prompting a user to add value into a prepaid account, establish a prepaid account, or change a level of service. If, after the addition of value, the balance of the prepaid account does not meet the threshold, then the policy decision point 24 may authenticate the subscriber terminal 12 to send traffic to the requested destination 28.

During the subscriber terminal's access to the data network 20, the balance of the prepaid account may be adjusted. For example, every second of access to the data network 20 or every transaction conducted by the user of the subscriber terminal 12 may be equivalent to a value of the balance in the prepaid account. As the service is provided, the balance in the prepaid account may be adjusted until the balance meets a threshold.

When the balance of the prepaid account again meets the threshold, the policy decision point 24 may instruct the data gateway 18 to redirect traffic from the subscriber terminal 12 to the web server 26. In response, the web server 26 may send one or more screens to the subscriber terminal 12 so that the user of the subscriber terminal 12 may add value into the prepaid account and/or select another prepaid data service. The user may then continue the prepaid data service over the communications network 16.

B. Exemplary Network Architecture for Wireless Prepaid Data Service

Figure 2:
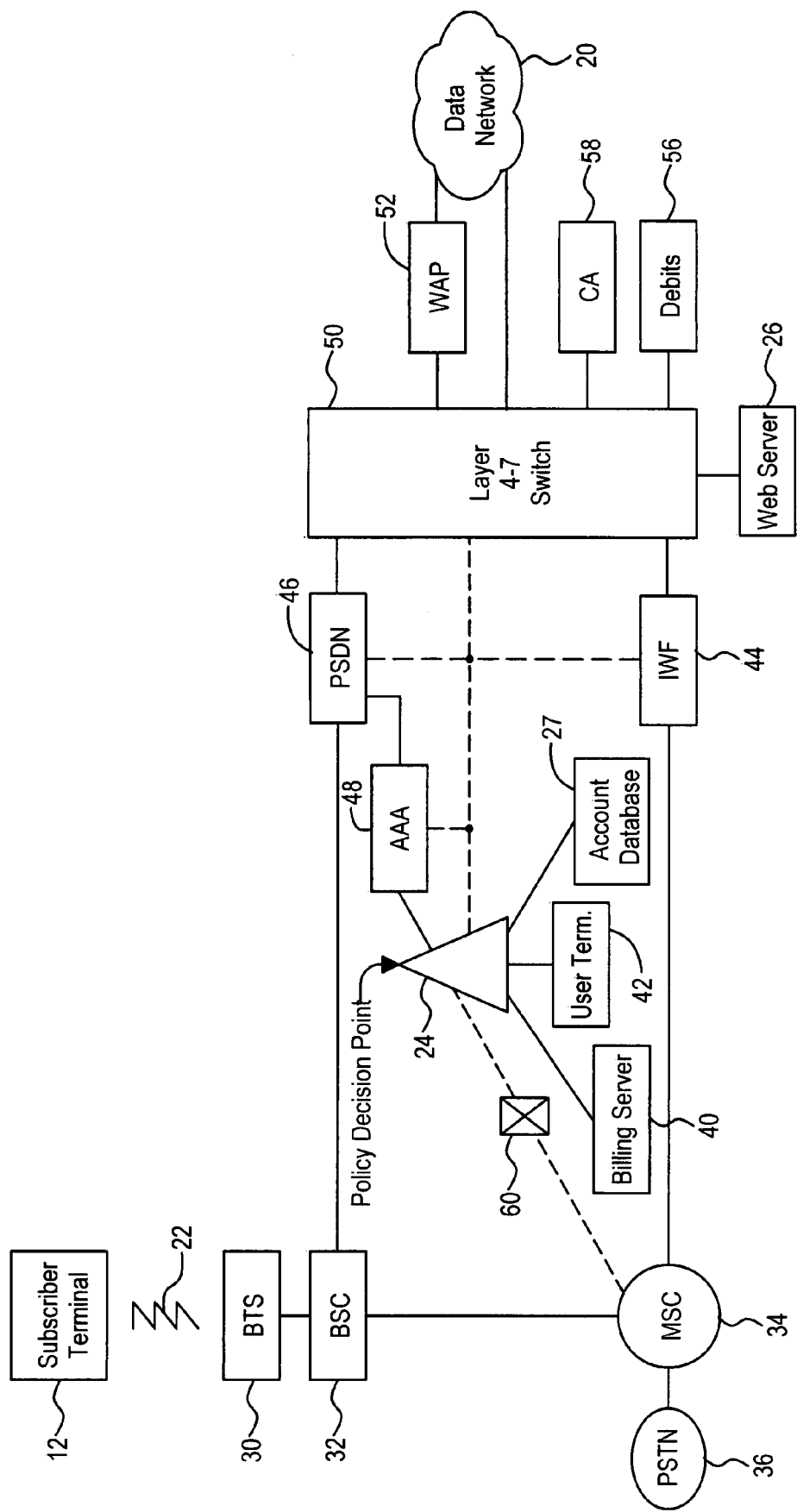
FIG. 2 is a block diagram of an exemplary wireless network architecture configured to offer prepaid data service.

FIG. 2 illustrates an exemplary embodiment of a wireless network configured to provide prepaid data service. As illustrated in FIG. 2, the wireless network may be a "third generation" (3G) packet-based network providing voice and data communications services. Exemplary embodiments of the present invention may be implemented in the 3G network, but such implementations are not limited to the 3G architecture.

The wireless network is shown to include a subscriber terminal 12, which communicates, via an air interface 22, with a base transceiver station (BTS) 30. The subscriber terminal 12 may communicate with the base transceiver station (BTS) 30 using various protocols, such as Carrier Division Multiple Access (CDMA), CDMA 2000, or Wideband CDMA. The BTS 30 may include an antenna that produces a radiation pattern defining a cell and/or sector in which a plurality of subscriber terminals is assumed to be operating. The BTS 30 may, in turn, communicate with a base station controller (BSC) 32, which controls traffic via a plurality of BTSs. The BSC 32 may communicate with a mobile switching center (MSC) 34. The BTS 30 and BSC 32 may serve as an exemplary embodiment of the access gateway 14 of FIG. 1.

The MSC 34 may be coupled to a policy decision point 24 via a signal transfer point 60 (STP). The policy decision point 24 may be a database or server such as a service control point (SCP), a service agent, or a network capabilities gateway (NCG). The SCP, service agent, and NCG may maintain logic for call processing.

The policy decision point 24 may also be coupled to a user/terminal/service database 42, a billing server 40, an account database 27, and an authorization, authentication, and accounting (AAA) server 48. The user/terminal/service database 42, the billing server 40, and the AAA server 48 may perform various functions. For example, the user/terminal/service database 42 may store information on capabilities of the subscriber terminal 12 connected to the communications network 16. The AAA server 48 may verify that a terminal is authorized to communicate over the communications network 16 and that a given subscriber is authenticated to communicate over the communications network 16. The billing server 40 may track the balance of the prepaid account as stored in the account database 27. Of course, these network elements may discretely or cooperatively perform these functions.

The MSC 34 and/or BSC 32 may also communicate with the data network 20. The MSC 34 may communicate with the data network 20 through an interworking function (IWF) 44. The IWF 44 may format traffic into packets and transmit and receive the traffic as between the communications network 16 and the data network 20. The traffic may pass the through a switch 50 which implements levels 4-7 of the open systems interconnect (OSI) model. The bearer traffic may also pass through a wireless access protocol (WAP) server 52, which facilitates exchange of WAP traffic as between the communications network 16 and the data network 20.

Additionally or alternatively, the BSC 32 may communicate with the data network 20 through a packet data serving node (PDSN) 46. The PDSN 46 may route packets through the switch 50 and the data network 20. Additionally, the PDSN 46 may be coupled to the AAA server 48.

1. Authorizing the Subscriber Terminal

Prepaid data service in accordance with exemplary embodiments of the present invention may begin with the subscriber terminal 12 establishing a communication session with the communications network 16. For example, if the communications network has a PDSN 46, the subscriber terminal 12 may establish a point-to-point protocol (PPP), a PPPoE (PPP over Ethernet), a DHCP (Dynamic Host Control Protocol), or a bridged session with the PDSN 46. Of course, other arrangements are also possible.

According to an exemplary embodiment of the present invention, the PDSN 46 may authorize the subscriber terminal 12 to access the communications network 16. Authorization may require that the subscriber terminal 12 register with a home agent and/or a foreign agent. The home agent and foreign agent may be software entities residing on the PDSN 46 that exchange packets with the subscriber terminal 12.

The subscriber terminal 12 may subscribe to a carrier, e.g., XYZ Corporation, that runs a home network. If the subscriber terminal 12 is on the home network, then the subscriber terminal 12 may contact its home agent to establish communications over the wireless network. The subscriber terminal 12 may provide a unique identification such as a mobile identification number (MIN) to the home agent. Having the MIN, the home agent may query the AAA server 48 using RADIUS protocol, for example. The AAA 48 server may indicate if the subscriber terminal 12 is authorized to access the communications network.

If the subscriber terminal 12 is in a foreign network (e.g., run by a carrier to which the subscriber terminal does not subscribe), the foreign agent may enable the subscriber terminal 12 to register its presence at a remote location. As part of registration, the subscriber terminal 12 may provide the foreign agent with a home address that uniquely identifies its home agent. The subscriber terminal 12 may also provide the foreign agent with a MIN. Using the home address, the foreign agent may contact the home agent to authorize the subscriber terminal 12. Using the MIN, the home agent may access the AAA server 48 to determine if the subscriber terminal 12 is authorized to communicate over the communications network 16.

2. Authenticating the User

After authorization, the wireless network may authenticate the user of the subscriber terminal 12. Authentication may involve determining whether a user of the subscriber terminal 12 has a prepaid account and what is the balance of the prepaid account.

The policy decision point 24 may authenticate the subscriber terminal to access to the data network 20. The subscriber may be authenticated using a Network Access Identifier (NAI). They typical form is user@realm. The policy decision point 24 may first determine a balance of a prepaid account. The balance may reside preferably in the account database 27, but other arrangements are also possible (such as in the AAA server 48 and/or billing server 40).

The policy decision point 24 may query the user/terminal/service database 42 using a database protocol such as Lightweight Database Access Protocol (LDAP) and/or query the AAA server 48 using RADIUS protocol. If the balance does not meet a threshold, the policy decision point 24 may authorize the subscriber terminal 12 to access the data network 24.

If the balance of the prepaid account meets the threshold or, alternatively, if the subscriber terminal 12 does not have a prepaid account, a policy enforcement point (e.g., PDSN 46, IWF 44, switch 50, WAP server 52, MSC 34, or a combination thereof) may redirect traffic from the subscriber terminal to the web server 26. For example, if the traffic over the wireless network conforms to HTTP, the policy decision point may instruct the PDSN 46 to redirect HTTP traffic, specifically an HTTP request, from the subscriber terminal 12 to the web server 26. So if a user of the subscriber terminal 12 wishes to visit a requested destination such as www.news.com, for example, the HTTP request may be redirected to the self-service portal instead of www.news.com. The PDSN 46 may redirect the HTTP requests to the self-service portal by altering a destination address of the HTTP request to that of the web server 26. Of course, other arrangements are also possible for redirecting traffic to the web server 26 depending on the architecture of the communications network 16 and the format of the traffic.

a. Adding Value and Selecting a Service at the Self-Service Portal

The web server 26 may have a self-service portal. The self-service portal may have a variety of screens displayable on the subscriber terminal 12. The screens may enable a user to refresh a balance of a prepaid account, select a prepaid data service, and to allow or disallow certain protocols, for example. One example is to disallow session initiation protocol (SIP). FIG. 3 is an exemplary screen sent by the web server 26 and displayed on the subscriber terminal in response to the redirection of the subscriber terminal's HTTP request to the web server. The screen may first prompt the subscriber for a user name (e.g., member name) and password. This could also be of the form user@realm. The web server, through the switch 50, may then query the AAA server 48 to determine whether the user name and password is valid. If the user name and password is valid, the user may have a prepaid account on the communications network 16.

If the user of the subscriber terminal does not have a user name and password, the screen may provide an option where the user may establish a new prepaid account. The user may be asked a series of questions to establish a prepaid account, such as a billing address, a user name, and a password for the account. Of course, other arrangements are also possible for establishing the prepaid account.

If the user of the subscriber terminal 12 has a prepaid account, the subscriber terminal 12 may display the screen of FIG. 4. FIG. 4 is an exemplary screen illustrating exemplary classes of prepaid data services selectable by the user of the subscriber terminal 12. The prepaid data services offered by the self-service portal may include timed access (e.g., 20 minutes of access) to the network or rate-controlled data access (e.g., 150 kbps) to the network. Other examples are peak or sustained data rate. The self-service portal may also offer service packages. The service packages may offer varying data rate services depending on the type of traffic. For example, HTTP traffic may be passed through the data gateway at a rate of 150 kbps, file transfer protocol (FTP) traffic may be passed at rate of 100 kbps, and video traffic may be passed at a rate of 250 kbps. The data rates may be selected based on delay sensitivities of the various types of traffic and the capabilities of the subscriber terminal 12.

Still alternatively, the web server 26 may offer various application layer services. The services may include transfer of a specific number of files (e.g., according to FTP) between the subscriber terminal 12 and the data network 20, transmission of a certain number of packets, download of a specific type of content (e.g., a song), and/or performance of a specific type of transaction (e.g., a stock quote). Of course, other types of services are also possible.

Figure 5:
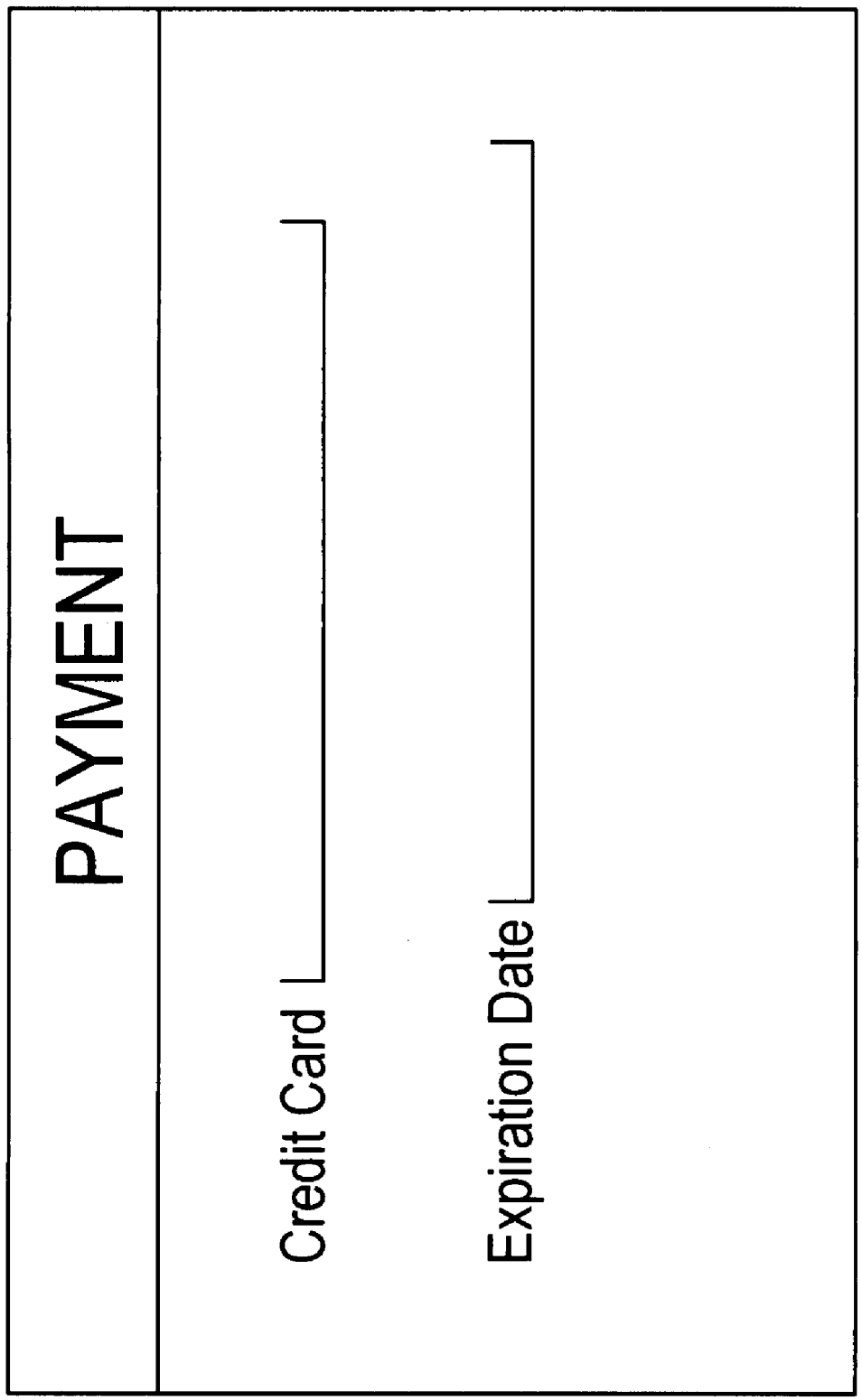
FIG. 5 is an exemplary screen for adding value to a prepaid account.

The self-service portal may also request that the user select a method of payment for the service that is selected. The web server 26 may present a screen to add value to the balance of the prepaid account. As shown in FIG. 5, the screen may request that the subscriber terminal 12 provide a credit card or debit card number. Upon receipt of the credit card or debit card number, the web server 26 may communicate with a debit entity 56 that debits the credit card or debit card to pay for the services. The debit entity 56 may be connected to the switch 50, the billing server 42 (not shown), or other network element.

Alternatively, the AAA server 48, the billing server 42, and/or the account database 27 may store the credit card and debit card information for the user of the subscriber terminal 12. The web server 24 may present a screen (also not shown) on the subscriber terminal 12 that requests that the user authorize debit of a credit card or debit card. Upon authorization, the policy decision point 24 may then query the AAA server 48 and/or billing server 42 for an account number and debit the appropriate card. Thus, the user of the subscriber terminal 12 may not have to provide a credit card or debit card each time he wishes to pay for prepaid data services.

As a further measure of security, the web server 26 may also query a certificate authority 58 (CA). The CA 58 may verify the identity of the user of the subscriber terminal 12. The CA 58 may be yet another server connected to the switch 50 as shown in FIG. 2 or to the billing server 42 (not shown). The CA 58 may verify the owner of the credit card of debit card to prevent fraudulent transactions. Secure technology, such as secure-HTTP, may be used to verify the identity of the user.

In addition to the credit card or the debit card, the web server 26 may accept other forms of value. For example, the web server 26 may accept frequent flyer miles which may be translated into a value of prepaid service and added to the balance of the account. Other variations are also possible.

b. Defining a Policy at a Policy Decision Point

If the subscriber terminal 12 has a certain amount of value in the prepaid account, then the policy decision point 24 may formulate a policy. The policy may define when and for how long the subscriber terminal 12 can access the data network 20. The policy may be encoded in computer instructions that are sent to a policy enforcement point, e.g., the PDSN 46, switch 50, MSC 34, IWF 44, and/or WAP server 52, that executes the policy.

The PDSN 46 may be a policy enforcement point for traffic that conforms to HTTP. Alternatively, the WAP server 52, the IWF 44, and the switch 50 may be a policy enforcement point for circuit-switched traffic that passes through the MSC 34. Still alternatively, the MSC 34 may be a policy decision point if the traffic is circuit-dialed access traffic. Circuit dialed access traffic is traffic routed between a plurality of modems on the IWF 44 and through the MSC 34 to the PSTN 36.

At a simplest form, the policy may instruct the policy enforcement point to allow traffic from the subscriber terminal 12 to pass unrestricted to the data network 20. The policy decision point 24 may allow packets, for example, with a source address of the subscriber terminal 12 to pass to the data network 20. The subscriber terminal 12 may be granted access to the data network 12 until the communication session with the subscriber terminal 12 ends.

The policy enforcement point according to this simple policy may be the WAP server 52, but other arrangements are also possible. Traffic conforming to WAP may pass via the MSC 34, the IWF 44, and the switch 52 to the WAP server 52. The policy decision point 24 may instruct the WAP server 52 to pass the traffic having a source address of the subscriber terminal 12 to the data network 20. When the subscriber terminal 12 is dropped (i.e., the communication session ends), the MSC 34 may send a user detail record (UDR) to the billing server 40 and/or AAA server 48. The UDR is a record generated by the MSC that indicates the duration that the user may be communicating over the data network 20. The billing server 40 and/or AAA server 48 may use the UDR to update the balance of the prepaid account 54 in the account database 27 in accordance with the duration of service provided. If the balance of the prepaid account does not meet the threshold, the policy decision point 24 may instruct the WAP server 52 to redirect the traffic from the subscriber terminal 12 to the self-service portal. At the self-service portal, the user may add value to his prepaid account.

A more complex policy may instruct the policy enforcement point to perform various functions. The policy may instruct the policy enforcement point of the subscriber terminal's capabilities, for example. The user service terminal database 42 may store a language preference of the subscriber terminal 12, a data rate capacity of the subscriber terminal 12, and a display capability of the subscriber terminal 12, for example. The policy decision point 24 may use the information about the subscriber terminal 12 to refine the level of service to the subscriber terminal 12. For example, if a subscriber terminal 12 can handle a maximum rate of traffic in the form of video, the policy decision point 24 may formulate a policy not to exceed this rate.

The policy may also instruct the policy enforcement point to monitor the service granted to the subscriber terminal 12. For example, if the policy enforcement point is the PDSN 46 or switch 50, the policy may instruct the PDSN 46 or switch 50 to count the number of file transfers completed, the number of packets transmitted or received, the number of downloads of a song, and/or the number of stock transaction. At specific instants of time, the policy may also instruct the PDSN 46 or switch 50 to push the current count to the policy decision point 24. As each packet or transaction, for example, may translate into a number of utils, the policy decision point 24 may then adjust the balance of the prepaid account in accordance with the count.

Additionally or alternatively, the functions performed by the policy decision point 24 may be performed on the policy enforcement point. According to such an exemplary embodiment, the policy enforcement point 24 need not push counts to the policy decision point 24 during the period that the subscriber terminal 12 is granted access to the data network 20.

For example, the policy may instruct the policy enforcement point to track the subscriber terminal's access to the data network 20. The policy may instruct the policy enforcement point to establish a counter. The counter may be set with a maximum time or maximum number of services, for example, that may be provided to the subscriber terminal 12. The maximum time or maximum number of services may be set in accordance with the balance of the prepaid account. The policy may also instruct the policy enforcement point to decrement the counter as time passes or as services are used. When the counter meets a predetermined threshold, e.g., zero, the policy may instruct the policy enforcement point to redirect the traffic from the subscriber terminal 12 to the self-service portal 26. At that time, the policy enforcement point may also provide an indication to the policy decision point 24.

Other arrangements are also possible. For example, the counter may alternatively count upwards until the amount of prepaid data service provided to the subscriber terminal meets the threshold.

Additionally, the policy decision point may instruct the policy enforcement point to send an alert to the subscriber terminal 12 when the balance of the prepaid account is running low. FIG. 6 is an exemplary embodiment of an alert. The alert may be a text message, e.g., an HTTP web-page, that pop-ups on a display of the subscriber terminal 12. The alert may inform the user of the duration of access available, for example, 5 minutes before the end of prepaid access. Alternatively, the alert may be in the form of voice packets bridged onto the data traffic so as to announce the remaining duration of access available to the subscriber terminal 12.

3. Executing the Policy at a Policy Enforcement Point

The policy decision point 24 may communicate the policy to the policy enforcement point using various protocols such as Diameter, SIP, common object representation broker architecture (CORBA), or a proprietary protocol. The policy enforcement point, being the PDSN 46, switch 50, WAP server 52, IWF 44, MSC 24, or other network element, may then execute the policy.

The policy enforcement point may allow the subscriber terminal 12 access to the data network 20 in accordance with the policy. If the policy so instructs, the policy enforcement point may push a count of packets or functions to the policy decision point 24. The policy decision point 24 may then adjust the balance of the prepaid account in accordance with the count. If the balance meets the threshold, the policy decision point 24 may instruct the policy enforcement point to redirect the traffic from the subscriber terminal 12 to the web server 26.

Alternatively, the policy enforcement point may maintain a counter. The counter may be adjusted depending on the services provided to the subscriber terminal 12. When the counter meets a threshold, the policy enforcement point may send an indication to the policy decision point 24. The policy enforcement point may terminate the traffic to the data network and also redirect the traffic from the subscriber terminal 12 to the web server 26.

Upon traffic from the subscriber terminal 12 being redirected to the web server 26, the web server 26 may responsively send a screen to the subscriber terminal 12. The screen may allow the client to refresh his prepaid account. The screen may be similar to that of FIG. 4 or 5 in which the user may purchase additional services on the communications network 16, for example, by authorizing additional charges on a credit card or debit card, for example.

C. Providing Centralized Billing

The exemplary embodiments described thus far assume that a single prepaid data service is provided to the subscriber terminal 12. The subscriber terminal 12, however, may simultaneously request multiple services from the communications network 16. The billing server 40, and/or AAA server 48 may maintain the balance of the prepaid account in an account database 27 while multiple services are being provided to the subscriber terminal 12. The multiple services may include timed access, data service at a predefined rate, or a specified number of transactions. Other services are also possible.

Figure 7:
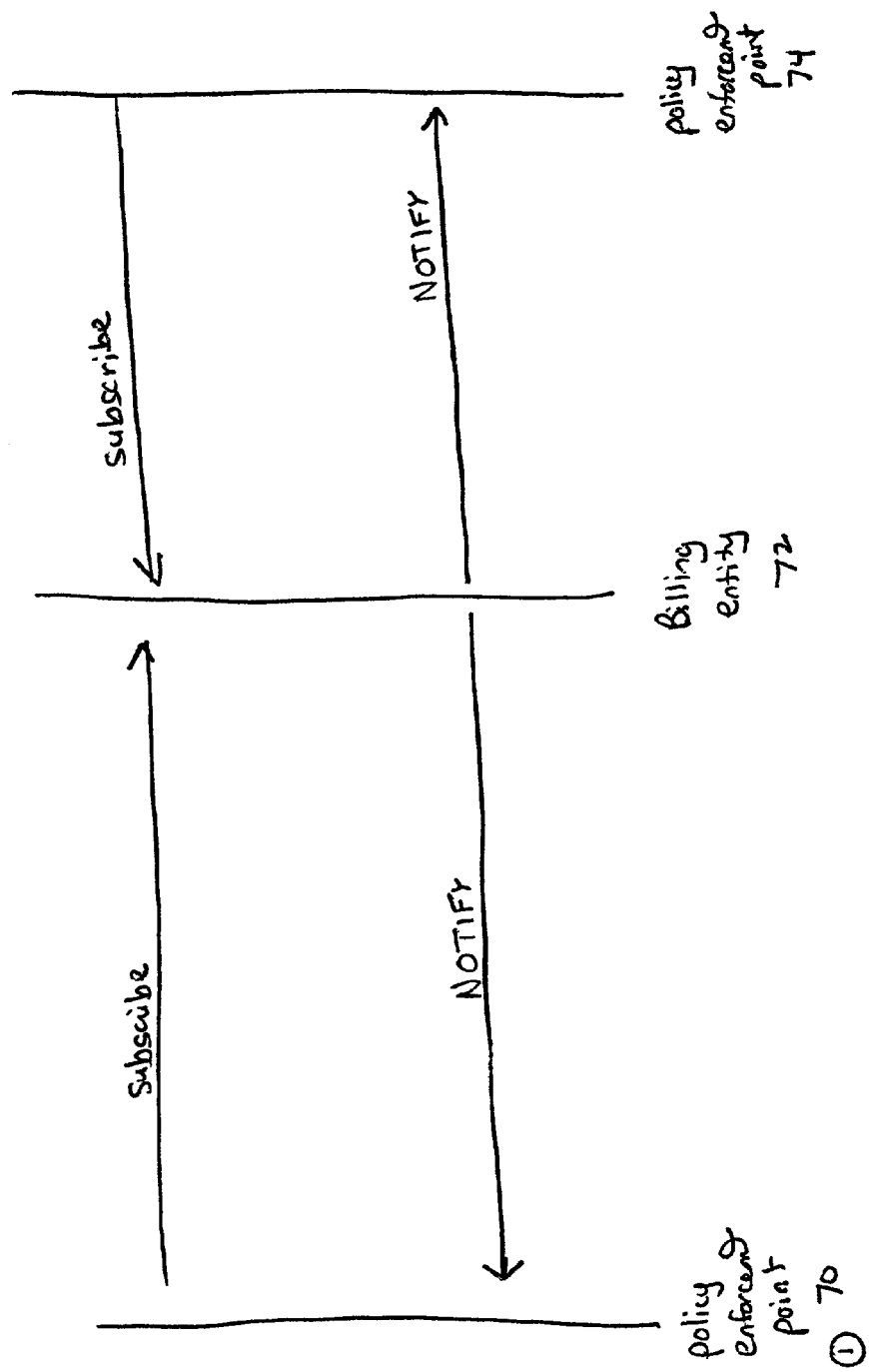
FIG. 7 is a process flow illustrating communications between a policy enforcement point and a billing entity during a subscription of multiple prepaid data services.

FIG. 7 illustrates a process flow of communications between a policy enforcement point and a billing entity during the subscription of multiple prepaid data services. For example, at time 0 seconds (s), User A may have $10 in a prepaid account. User A may request a data session with a policy enforcement point 70 such as the PDSN 46. In accordance with an exemplary embodiment of the present invention, the policy enforcement point 70 may subscribe to the billing entity 72 to request to be notified if the credit runs out. The policy enforcement point 70 may use event notification in SIP protocol, for example, to subscribe to the billing entity 72. The policy enforcement point 70 may send a SUBSCRIBE message. The billing entity 72 may then look up the rate for the call and start a timer. For example, if the rate of the call is $0.03/s, the prepaid data service expires in $10/($0.03/s)=333 s.

At time 100 s, User A may also request a second a data service. A second policy enforcement point 74, also a PDSN, for example, may send a SUBSCRIBE message to the billing entity 72 to be notified if the credit runs out. The billing server 72 may stop the timer and update the current credit. For the present example, the current credit may be (333 s−100 s)*$0.03/s=$7. Then the billing server 72 may look up the rate for the new service, for example at $0.25/s and start the timer again. The timer may be started at the new credit and run with the combined rate=$7/($0.03/s+$0.25/s)=25 s.

At time 125 s, the timer may expire, and all services that have subscribed to be notified in case the credit expires may be notified. In the exemplary embodiment, it would be the two policy enforcement points 70, 74. The billing entity 72 may signal the two policy enforcement points 70, 74, e.g., using a SIP NOTIFY event, that the timer has expired. The signal may indicate that a status of the timer has changed. In response, the policy enforcement points 70, 74 may terminate traffic between the subscriber terminal 12 and the data network 20. Thus, a single billing entity may be used to maintain an account balance for multiple prepaid data services.

Instead of the billing entity 72 solely keeping track of network usage, the policy enforcement points 70, 74 and the billing server 72 may cooperatively keep track of multiple prepaid data services. The policy enforcement point 70, 74 may have a timer. Whenever a new service starts, the billing server 72 may calculate a new timer value. The billing server 72 may then send the new timer value to the subscribing policy enforcement points 70, 74. The policy enforcement points 70, 74 may reset its timer with the new timer value and continue to decrement the timer as services are provided to the subscriber terminal 12. When the duration of time expires, the policy enforcement points 70, 74 may terminate the subscriber terminal's access to the data network 20.

Still alternatively, the policy enforcement points 70, 74 may periodically (either regularly or non-regularly) poll the billing entity 72 rather than the billing server 72 sending a notification when the timer has expired. The policy enforcement point 70, 74 may send a indication to the billing entity 72 so as to subscribe with the billing entity 72 to receive events. The policy enforcement point 70, 74 may request that the billing server 72 provide the remaining time of service available to the subscriber terminal 12. If the billing server 72 indicates that the time is zero, then the policy enforcement points 70, 74 may redirect the subscriber terminal's traffic to the self-service portal. Other arrangements are also possible.

Exemplary embodiments of the present invention have thus been illustrated and described. It will be understood, however, that changes and modifications may be made to the invention as described without deviating from the spirit and scope of the invention, as defined by the following claims.

We claim:

1. A method for providing first and second prepaid data services to a subscriber terminal in a communications network coupled by a gateway to a data network, the method comprising:
    making a first determination of whether a balance of a prepaid account of a corresponding subscriber for the first and second data services meets a first threshold determined in response to the first data service;
    if the first determination is that the balance of the prepaid account does not meet the first threshold, then passing traffic to a first requested destination in the data network corresponding to the first data service;
    making a second determination of whether the balance of the prepaid account does not meet a second threshold determined in response to the second data service; and
    if the second determination is that the balance of the prepaid account does not meet the second threshold, then redirecting the traffic from the subscriber terminal to a self-service portal.

2. A system for providing prepaid data service to a subscriber of a communications network, comprising:
    a subscriber terminal coupled to the communications network;
    a data network;
    a data gateway coupling the communications network to the data network;
    a web server coupled to the data gateway;
    wherein the data gateway comprises a processor, a memory, and computer instructions stored in the memory and executable by the processor for:
        passing traffic from the subscriber terminal to a requested destination in the data network if a balance of a prepaid account of the subscriber for the data service does not meet a threshold; and
        redirecting the traffic to the web server if the balance of the prepaid account meets the threshold; and
    wherein the web server comprises a processor, a memory, and computer instructions stored in the memory and executable by the processor for:
        adding value to the balance of the prepaid account in response to the balance of the prepaid account meeting the threshold.

3. The system of claim 2, wherein a determination of whether the balance of the prepaid account meets the threshold comprises comparing the prepaid account to the threshold.

4. The system of claim 2, further comprising a policy decision point, the policy decision point having a processor, a memory, and computer instructions stored in the memory and executable by the processor for comparing the balance of the prepaid account to the threshold to determine whether the balance of the prepaid account meets the threshold.

5. The system of claim 2, further comprising a self-service portal residing on the web server.

6. The system of claim 2, further comprising a self-service portal residing on the web server, wherein the self-service portal comprises computer instructions for selecting a level of prepaid data service.

7. The system of claim 2, wherein the data gateway comprises computer instructions stored in the memory and executable by the processor for directing the traffic from the subscriber terminal to the web server in response to a communication session being established with the subscriber terminal.

8. The system of claim 2, wherein the data gateway comprises an entity selected from the group consisting of a PDSN, an MSC, an IWF, a WAP server, and a switch.

9. The system of claim 4, wherein the policy decision point comprises an entity selected from the group consisting of a service agent, a service control point, and a network capabilities gateway.

10. The system of claim 2, wherein the data gateway further comprises computer instructions stored in memory and executable by the processor for sending an alert to the subscriber terminal, the alert providing a notification of prepaid access available to the subscriber terminal.

11. The system of claim 10, wherein the alert is selected from the group consisting of a text message and a voice message.

12. The system of claim 2, wherein (i) the subscriber terminal transmits the traffic over an air interface to an access gateway, and (ii) the access gateway is coupled to the data gateway by the communication network.

13. The system of claim 2, wherein the subscriber terminal is a wireless terminal.

14. The system of claim 2, further comprising:
a billing server; and
the data gateway further comprising computer instructions stored in the memory and executable by the processor for:
subscribing to the billing server to determine the balance of the prepaid account; and
receiving an indication of the balance of the prepaid account from the billing server.

15. The system of claim 14 wherein the indication is whether the balance of the prepaid account meets the threshold.

16. The system of claim 14 wherein the data gateway further comprises computer instructions for polling the subscriber terminal for the indication of the balance of the prepaid account.

17. The system of claim 2 wherein a counter representing the balance of the prepaid account is adjusted as traffic passes to the requested destination.

18. A system for providing first and second prepaid data services to a subscriber of a communications network, comprising:
a subscriber terminal coupled to the communications network;
a data network;
a data gateway coupling the communications network to the data network;
wherein the data gateway comprises a processor, memory, and computer instructions stored in the memory and executable by the processor for:
passing traffic to a first requested destination corresponding to the first data service in the data network if a balance of a prepaid account of a corresponding subscriber does not meet a first threshold;
passing traffic to a second requested destination corresponding to the second data service in the data network if a balance of the prepaid account does not meet a second threshold;
monitoring use of the first and second data services until a predetermined credit expires;
notifying both the first and second data services that the predetermined credit expires; and redirecting the traffic to a self-service portal when the predetermined credit expires.

19. The system of claim 18, wherein the data gateway is a WAP server.

* * * * *

UNITED STATES PATENT AND TRADEMARK OFFICE
CERTIFICATE OF CORRECTION

PATENT NO. : 7,634,446 B2
APPLICATION NO. : 09/997946
DATED : December 15, 2009
INVENTOR(S) : Jones et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 3063 days.

Signed and Sealed this

Ninth Day of November, 2010

David J. Kappos
*Director of the United States Patent and Trademark Office*